Patented Apr. 1, 1924.

1,489,225

UNITED STATES PATENT OFFICE.

GEORG KALISCHER, OF FECHENHEIM, NEAR FRANKFORT-ON-THE-MAIN, GERMANY, ASSIGNOR TO LEOPOLD CASSELLA & CO. GESELLSCHAFT MIT BESCHRÄNKTER HAFTUNG, A CORPORATION OF GERMANY.

ALKYLATED DERIVATIVE OF VAT DYESTUFFS AND PROCESS OF MAKING SAME.

No Drawing. Application filed April 2, 1923. Serial No. 629,509.

*To all whom it may concern:*

Be it known that I, GEORG KALISCHER, a citizen of the German Republic, residing at Waldstrasse 23, Fechenheim, near Frankfort-on-the-Main, Germany, have invented new and useful Improvements in Alkylated Derivatives of Vat Dyestuffs and Processes of Making Same, of which the following is a full description.

Object of my invention is the production of alkylated derivatives of the vat dyestuffs derived from anthracene, which are obtainable by treating anthracene compounds in the known manner with sulfurizing agents [see for instance U. S. Patent 922,282, German Patents 242,029 and 247,416 (Journal of the Society of Chemical Industry 1912, page 767)]. These sulfur containing vat dyestuffs, some members of which are on the market as indanthrene olive, hydron olive G, hydron brown OG, have, as described in the patents cited above, the property of yielding in presence of an alkaline hydrosulfite, vats of a brown, bluish violet, blue to black coloration. Now I have found that the leuco compounds, dissolved in the alkaline vats, when treated with alkylating agents easily produce alkylated derivatives. These new compounds are neither any longer oxidizable, nor changeable with alkaline hydrosulfite but they are of an intense coloration, in shades approximately resembling the coloration of the vats, totally differing from the color of the primary materials. For instance the reddish brown dyestuff of German Patent 247,416, obtained by heating anthracene with sulfur chloride to temperatures not greatly exceeding 220° C., yields, when treated in the vat with bromo-ethyl, a dark blue coloring matter, whereas the olive green dyestuff (indanthrene olive) produced according to Example 2 of U. S. Patent 922,282, by the same reaction yields a similar black product. For carrying out the process all the customary alkylating agents may be used, as for instance halogen alkyls, alkyl sulfates, halogenated fatty acids and their esters, benzyl-halogenides; moreover suitable aromatic-quaternary ammonium compounds containing at least one aromatic residue, as for instance trialkylnaphthyl or dialkylbenzyl-arylammonium salts, etc.

These new bodies are valuable primary materials for producing new dyestuffs and some of them may also be applied for dyeing purpose. However they may likewise be produced on the fibre by aftertreating the fibre which is dyed with the said vat dyestuffs in the presence of alkaline reducing agents, as for instance hydrosulfite or glucose, with alkylating agents preferably with such as are soluble in water. By this treatment the product of reduction of the respective dyestuff (the leuco compound) is formed on the fibre which then by the alkylating agent, is transformed into the insoluble alkylated derivative.

Blue, brown, grey to black shades are obtained in this manner which in properties of fastness, to chlorine and bowking in particular, are far superior to the original dyeings.

*Example 1.*

10 kg. of the reddish-brown dyestuff obtained according to the process of German Patent 247,416 are reduced and dissolved by heating with 20 kg. hydrosulfite, 40 kg. caustic soda lye 40° Bé. and 250 l water. At a temperature of about 50° C., 40 kg. of ethyl bromide are allowed to run slowly into the bluish violet solution. After treating for several hours in a boiler, provided with a reflux condenser, and stirring vigorously, the ethyl product is formed and separates in fine blue flakes which may be isolated by filtration in the usual manner. In the dry state it is a dark blue powder, insoluble in water, alkalies and acids. It can be re-crystallized by means of organic solvents. It separates for instance from chlorbenzene in greenish violet shining needles, the melting point of which is above 300° C. The compound dissolves in monohydrate with a blue coloration which on heating turns to brown.

If benzylchloride instead of ethylbromide be used, working on the same lines, an analogous dark blue compound is obtained, dissolving in monohydrate with a greenish brown color; it cannot be re-crystallized from chlorbenezene or nitrobenzene without decomposition.

*Example 2.*

40 kg. of chloroaceticacid ester are allowed to run into the vat prepared according to Example 1 and heated to about 30° C., stirring vigorously, until the dyestuff has completely fallen out. The resulting compound, isolated as usual, may be re-crystallized from monochlorbenzene and then forms fine blackish violet crystals of a melting point of about 240° C. The color of the solution in monohydrate is blue and turns green when heated.

In the same manner as with chloroaceticester the respective compound may also be produced with monochloracetic acid, the temperature being advantageously raised to 50–60° C. The compound, separating as a sodium salt, is filtered and washed with a solution of common salt. After drying it represents a black powder, easily dissolving in hot water with a violet color not being changed on the addition of alkaline hydrosulfite and separating as blue flakes by the addition of acids. The solution in monohydrate shows a blue coloration which on heating turns green. Wool in a feebly acid bath is dyed a greyish-blue shade.

*Example 3.*

By replacing the dyestuff of Patent 247,416 used in Example 1 by the olive green (or indanthrene olive G on the market) of Example 2, of U. S. Patent 922,282 (obtained by heating anthracene with sulphur) and by working in the same way, a black powder is produced, insoluble in the customary organic solvents and of a melting point above 300° C. The color of the solution in monohydrate is olive.

Similar compounds are obtained by employing the dyestuff produced according to German Patent 242,029 by heating anthracene with sulphur chloride to a temperature exceeding 220° C., or the dyestuffs known in trade as hydron olive G and hydron brown OG.

*Production of the alkylated derivatives on the fibre—Example 4.*

10 kg. of cotton are in the first instance dyed in the vat as usually with 5–10% of the brown-red dyestuff of Patent 247,416. Another bath is then charged with 2–3 cc. caustic soda lye 40° Bé. 1–2 gr. hydrosulfite conc. powder and 4–10 gr. trimethyl-α-naphthylammoniumchloride per one litre of water, the dyed cotton is then entered into the hot to boiling bath, treated for 20–30 minutes at the same temperature, rinsed and dried. The dyeing so aftertreated is intensely blue and possesses excellent fastness properties.

Other fatty-aromatic quaternary bases as for instance dimethylbenzylphenylammonium chloride (leucotrope O) which produces a more greenish blue may likewise be applied in place of trimethyl-α-naphthylammoniumchloride.

Similar changes of color occur if other alkylating agents are used. By employing for instance ethylenechlorhydrine, hydrosulfite and soda, blue shades are obtained, whereas with α-dichlorhydrine according to the same process more blackish shades result.

Dyeings produced by means of the olive green dyestuff of American Patent 922,282 or with the product of German Patent 242,029, when aftertreated as above described, yield brownish-grey to blackish shades.

Having now particularly described and ascertained the nature of my said invention, and in what manner the same is to be performed, I declare that what I claim is:

1. The process for producing alkylated derivatives of the vat dyestuffs derived from anthracene and obtained by treating anthracene compounds in the known manner with sulfurizing agents, which process consists in treating the said vat dyestuffs with alkylating agents in presence of an alkaline reducing agent, substantially as described.

2. Process of producing bluish to brownish to blackish colorations on fibres, fast to washing, chlorine and bowking, by aftertreating with alkylating agents in the presence of an alkaline reducing agent the vegetable fibre, which is dyed with the vat dyestuffs obtainable by sulfurizing in the known manner anthracene compounds, substantially as described.

3. Process of producing bluish to brownish to blackish colorations on fibres, fast to washing, chlorine and bowking by aftertreating with aromatic quaternary ammonium compounds, containing at least one aryl residue, in the presence of an alkaline reducing agent, the vegetable fibre which is dyed with the vat dyestuffs obtainable by sulfurizing in the known manner anthracene compounds, substantially as described.

4. Process of producing bluish to brownish to blackish colorations on fibre, fast to washing, chlorine and bowking, by aftertreating with dimethyl-phenyl-benzyl-ammoniumchloride (leucotrope O), in the presence of an alkaline reducing agent, the vegetable fibre which is dyed with the vat dyestuffs obtainable by sulfurizing in the known manner anthracene compounds, substantially as described.

5. As new articles of manufacture, the alkylated derivatives of vat dyestuffs which are produced by treating with alkylating agents in presence of an alkaline reducing agent the vat dyestuffs, obtained by sulfurizing in the known manner anthracene compounds, the alkylated derivatives thus obtained being in a dry state dark powders unchangeable with alkaline hydrosulfite, soluble in concentrated sulfuric acid with a blue to an olive to a blackish color, substantially as described.

In witness whereof I have hereunto signed my name this 27th day of February, 1923.

GEORG KALISCHER.

Witnesses:
BASIL E. SAVARD,
C. C. L. B. WYLES.